United States Patent [19]

Moriyama et al.

[11] 3,941,952

[45] Mar. 2, 1976

[54] TELEPHONE EXCHANGE SYSTEM EMPLOYING MEANS CAPABLE OF BREAKING A CONNECTION BETWEEN A TERMINAL UNIT AND A SWITCH FRAME USING MECHANICAL LATCHING TYPE CROSSBAR SWITCHES

[75] Inventors: Hiromi Moriyama, Fujisawa; Motosuke Kuwabara, Yokohama; Katsuyuki Jin, Kawasaki; Tadao Tsuruda, Yokohama, all of Japan

[73] Assignee: Hitachi, Ltd., Japan

[22] Filed: Dec. 21, 1973

[21] Appl. No.: 427,307

[30] Foreign Application Priority Data
Dec. 25, 1972 Japan............................. 47-129260

[52] U.S. Cl. .............................. 179/18 GE; 179/22
[51] Int. Cl.² ............................................ H04Q 3/00
[58] Field of Search ........................ 179/18 GE, 22

[56] References Cited
UNITED STATES PATENTS
3,101,392    8/1963    Brunberg et al..................... 179/22

Primary Examiner—William C. Cooper
Assistant Examiner—C. T. Bartz
Attorney, Agent, or Firm—Craig & Antonelli

[57] ABSTRACT

A telephone exchange system has a switch frame employing mechanical latching type crossbar switches. Input terminals of the switch frame are associated with incoming terminal units, while output terminals of the switch frame are associated with outgoing terminal units. The incoming and outgoing terminal units are provided with means capable of disconnecting the associated terminals from the terminal units when the call connection is opened at the telephone circuit.

2 Claims, 4 Drawing Figures

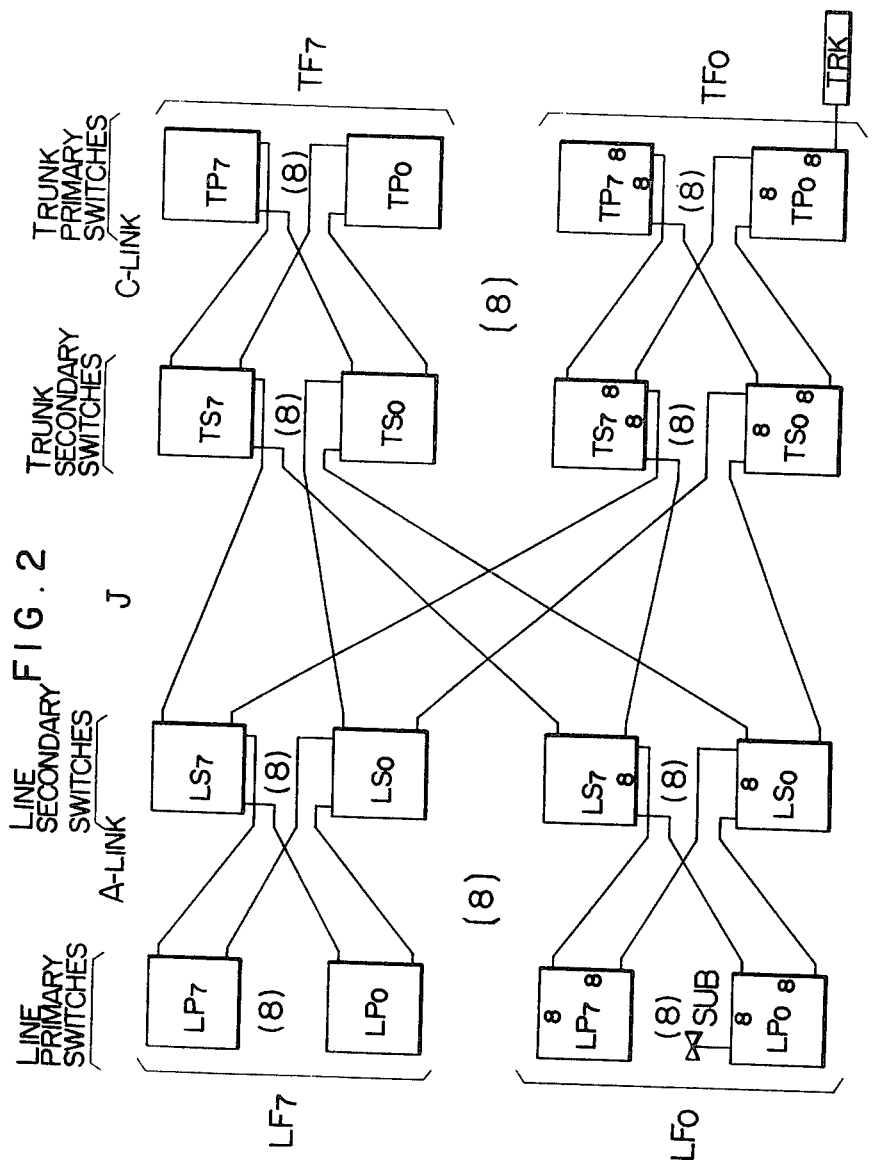

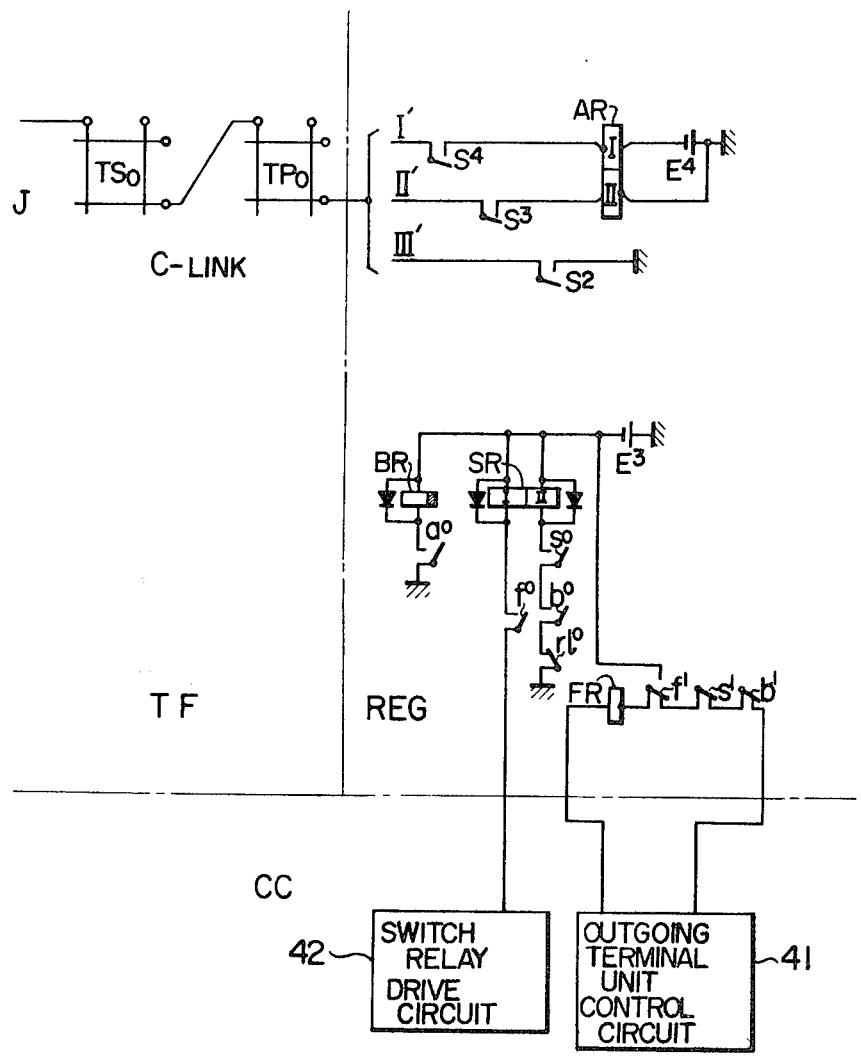

TELEPHONE EXCHANGE SYSTEM EMPLOYING MEANS CAPABLE OF BREAKING A CONNECTION BETWEEN A TERMINAL UNIT AND A SWITCH FRAME USING MECHANICAL LATCHING TYPE CROSSBAR SWITCHES

The present invention relates to a telephone exchange system, and more particularly to one having a switch frame comprising mechanical latching type crossbar switches.

Well known is a telephone exchange system using the crossbar switches, and also one employing the mechanical latching type crossbar switches for the purpose of minimizing the power consumption made during a call or an effective control of the telephone exchange system.

The mechanical latching type crossbar switch has an advatage in that no holding current is necessary. That is, the holding of the closing condition of a cross point can be mechanically made after it has been once closed by energizing the vertical and horizontal magnets corresponding to the cross point to be closed in the crossbar switch. However, the once closed cross point is held in the closed state unless it undergoes a release operation. If the release operation is not applied to the closed cross point, the terminal unit which has been used in a previous call may also be engaged in the use of a newly occurring call without release from the previous call. In order to resolve this problem it has been proposed to employ a common control which is adaptable to perform the release operation of a cross point every time that each closure of the subscriber's loop circuit made through the cross point has ended. This measure has disadvantages in that the common control must be provided with a means to detect each opening of the subscriber's loop circuit, and a means to effect the release operation on the crossbar switch in response to the detection of the former means, resulting in complexity in structure, increasing of the load and the need of many large common controls.

Further, this invites a limitation in fitting the terminal unit, especially in the case of utilizing a mechanical latching type crossbar switch in which the release of the once closed cross point is carried out by driving one of the vertical and horizontal magnets to be employed for closing the cross point, for example the horizontal magnet, the terminal unit as abovementioned must be provided on the horizontal line on which the horizontal magnet to be utilized for the release operation is disposed. This also restricts the variety of the combination of the crossbar switches for the construction of the switch frame. As a result, it is difficult to appropriately construct the switch frame in accordance with the number of the terminals. Additionally, it is impossible to perform a multiple connection such as an offering connection, in the crossbar switch fitted with the terminal unit. If the horizontal magnet is driven in order to make an offering connection to a line engaged in a call, the cross point previously closed is opened.

Still further, it is required to make provision of means to protect the contact of the cross point in the crossbar switch from damage due to cutting off the current flow in the release operation because, if it is made through the contact of the cross point, the contact tends to be damaged.

Accordingly, an object of this invention is to simplify the common control unit by eliminating the need of the release operation in the mechanical latching type crossbar switch.

Another object of this invention is to provide flexibility to the construction of the switch frame by employing a method whereby the terminal unit may be fitted on either horizontal or the vertical line of the mechanical latching type crossbar switch.

Still another object of the present invention is to permit a multiple connection in the mechanical etching type crossbar switch fitted with the terminal unit.

Another object of this invention is to eliminate the need of a special means to protect the cross point contacts of the crossbar switch of the same type from the damage.

The first feature of the present invention resided in that each of the terminal units incorporated in the switch frame constructed from the mechanical latching type crossbar switch is provided with means to disconnect the connection between the crossbar switch and the terminal unit per se in response to the detection of each opening of the subscriber's loop circuit.

Another feature of the present invention is that the terminal unit is comprised of a line relay and a cut off relay, and those relays are used as means to break the connection between the terminal unit per se and the crossbar switch.

Other objects and features of this invention will be apparent from the following description taken in connection with the accompanying drawings in which;

FIGS. 1a and 1b show an example of the mechanical latching type crossbar switch adapted to be used in the present invention, in which FIG. 1a is a schematic diagram of the crossbar switch and FIG. 1b is a timing chart to explain the operation of the crossbar switch in FIG. 1a;

FIG. 2 is a block diagram of an embodiment of the link frame in accordance with the present invention;

FIG. 4 is a schematic circuit diagram of a part of an outgoing terminal unit, a trunk line frame and a common control unit.

Figure 1A:
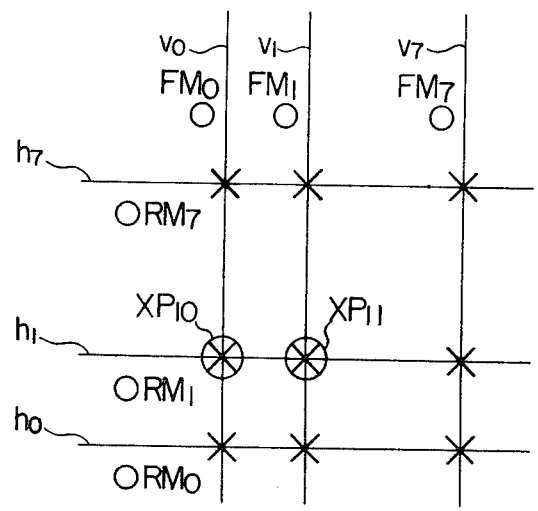
Figure 1B:
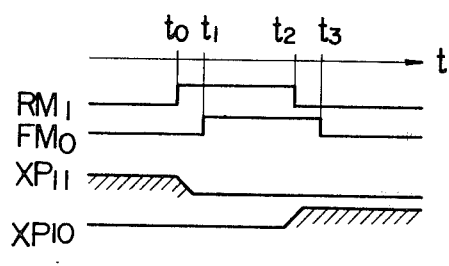

Referring now to FIG. 1a, there is shown an example of the mechanical latching type crossbar which is assembled from a horizontal group consisting of eight horizontal lines $h_0$ to $h_7$, a vertical group consisting of eight vertical lines $v_0$ to $v_7$, eight reset magnets $RM_0$ to $RM_7$, and eight finger magnets $FM_0$ to $FM_7$, wherein each horizontal line is provided with one reset magnet and each vertical line with one finger magnet, and these horizontal lines and vertical lines are arranged to form 64 cross points. It is noted here that each of the horizontal lines, vertical lines, and cross-points, for ease of explanation, are illustrated with a single element, although it is comprised of a plurality of components. The operation of the crossbar switch will be described with reference to FIG. 1b. When it is desired to close the cross point $XP_{10}$, the associated reset magnet $RM_1$ is first energized at time $t_0$, and the finger magnet $FM_0$ is next energized at time $t_1$. Then, the reset magnet $RM_1$ is released at time $t_2$, and at the substantially same time the cross point $XP_{10}$ is closed. At time $t_3$ following $t_2$ the finger magnet $FM_0$ is also released. However, the closed cross point $XP_{10}$ remains closed because a mechanical latching mechanism (not shown) maintains the closed condition thereof. By the way, if another cross point, e.i. the cross point $XP_{11}$, which is arranged on the horizontal line $h_1$ of the cross $XP_{10}$ to be closed, is closed before time $t_0$, the operation of the magnet $RM_1$ energized at time $t_0$ causes the cross point $XP_{11}$ to be opened.

FIG. 2 shows a switch frame of four stages constructed by the mechanical latching crossbar switches described above referring to FIG. 1.

As shown in FIG. 2, the switch frame is comprised of a group of eight line link frames $LF_0$ to $LF_7$, each line link frame including eight line primary switches $LP_0$ to $LP_7$ and eight line secondary switches $LS_0$ to $LS_7$, a group of eight trunk link frame $TF_0$ to $TF_7$, each trunk link frame including eight trunk primary switches $TP_0$ to $TP_7$ and eight trunk secondary switches $TS_0$ to $TS_7$, and a junctor J serving to properly connect the eight line link frames $LF_0$ to $LF_7$ and the eight trunk link frames $TF_0$ to $TF_7$. The arrangement of the link frame LF is as follows. An incoming terminal unit SUB is disposed on one side of each line primary switch LP where the finger magnets are fitted. The other side of each line primary switch $LP_0$ to $LP_7$ where the reset magnets are disposed is linked with the one side of the corresponding line secondary switch $LS_0$ to $LS_7$ where the finger magnets are fitted. The linking therebetween is made by means of a link A. Further details of the connection between the incoming terminal unit SUB and the line primary switches will be described in detail later referring to FIG. 3. The trunk link frame TF is arranged as follows. An outgoing terminal unit TRK is disposed on one side of the trunk primary switches TP where the reset magnets are fitted, taking the proper correspondence between the talking lines of the outgoing terminal unit and the horizontal lines of the trunk switches in the connection. The trunk primary switches TP and the trunk secondary switches TS are linked by means of a link C. Particularly, the link C serves to connect the vertical lines provided with the finger magnets in the eight trunk primary switches $TP_0$ to $TP_7$ and the horizontal lines provided with the reset magnets in the corresponding eight trunk secondary switches $TS_0$ to $TS_7$ with a due relation therebetween.

Figure 3:
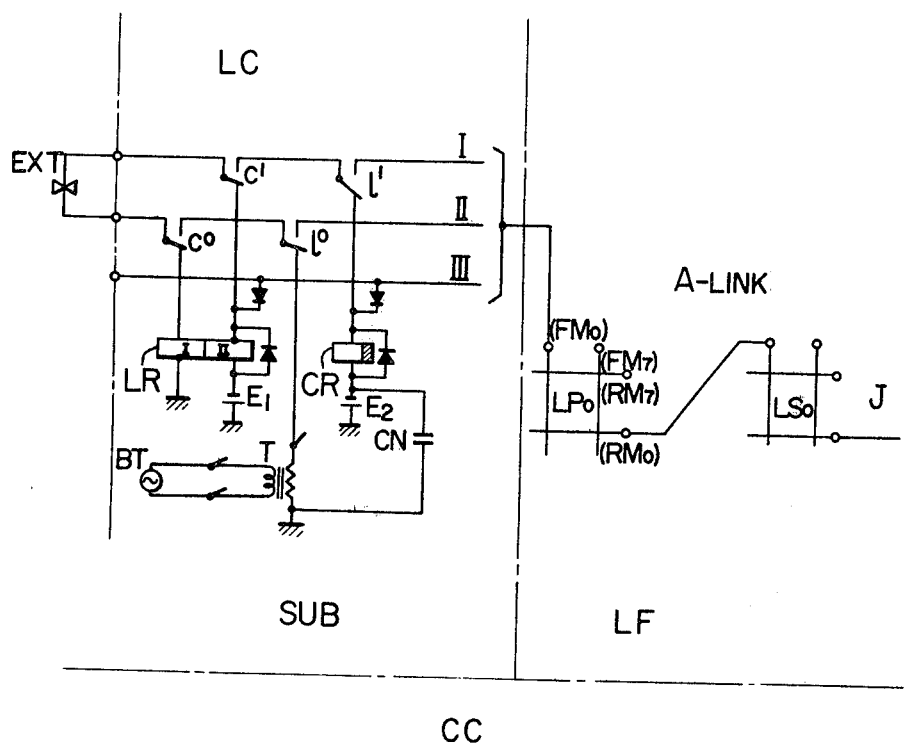
FIG. 3 shows a circuit diagram of a part of an incoming terminal unit and a line link frame.

FIG. 3 shows a part of the incoming terminal unit SUB and the line link frame LF shown in FIG. 2. The incoming terminal unit comprises a subscriber's end device EXT and a line circuit LC. In the figure, the reference character LR designates a line relay, CR a cut off relay, BT and audible busy-signal or busy tone source, T a transformer, CNa condenser, $LP_0$ the line primary switch of a zero numerical order, and $LS_0$ the line secondary switch of a zero numerical order. The leads designated by the reference numerals I and II are talking lines, and the lead of III is a control line.

FIG. 4 shows in part a register REG as an example of the outgoing terminal unit, the trunk frame TF, and a common control CC. In the figure, the reference character AR designates a talking monitor and pulse receiving relay, BR a position relay, SR a switching relay, FR a selecting relay for the outgoing unit, $TP_0$ the trunk primary switch of a zero numerical order, and $TS_0$ the trunk secondary switch of a zero numerical order. In FIG. 3 and FIG. 4, the small letter corresponding to the large letter representing the relay designates the contact thereof and the subscript of the small letter designates the number of the contact designated.

The operation of the switch frame will be described below.

The subscriber's end device EXT generates a signal which in turn closes the loop circuitry (not shown) in the EXT thereby forming the closed circuit consisting of ground, the line relay LR (the coil I), the break contact $C^0(B)$, the EXT, the contact $C^1$, the line relay LR, a battery $E_1$ and the ground. The line relay LR is energized by the forming of the closed circuit.

The identification circuit (not shown) serves to identify the subscriber originating a call with the result that the desired outgoing terminal unit is selectively seized by the common control CC. More particularly, the seized outgoing terminal unit is the register REG. An outgoing terminal unit control circuit 41, provided in the common control unit, energizes the outgoing terminal unit selecting relay FR of the register REG. The common control CC, after seizing the register REG, selects the desired link between the incoming terminal unit SUB, shown in FIG. 3, and the REG, shown in FIG. 4, of the outgoing terminal unit, thereby closing the cross point of the crossbar switch.

It will be recalled from the description made with reference to FIG. 1 that at the closing operation of this cross point, the cross point of the crossbar switch corresponding to each of the channels, the call connection through which has ceased, is released at the instant that the reset magnet is energized.

After closing the cross point, the common control CC energizes the switch relay SR in the register REG under the action of a switch relay drive circuit 42 provided in the common control. That is, the drive of the switch relay drive circuit 42 forms the closed circuit consisting of the switch relay drive 42 circuit per se, the closed contact $f^0$, the switch relay SR, and a battery $E_3$ to ground. By the energization of the switch relay SR, the leads I', II' and III' are connected with the line circuit LC, shown in FIG. 3, via the closed cross points of the crossbar switch $TP_0$ and $TS_0$, and $LS_0$ and $LP_0$ (shown in FIG. 3). The cut off relay CR of the line circuit LC is energized depending upon forming the closed circuit from the make contact $S^2(M)$ of the register REG (FIG. 4) through the lead III', $TP_0$, $TS_0$, $LS_0$, $LP_0$, III, the relay CR (the coil), and the battery $E_2$ to ground. The subscriber's end device EXT is disconnected from the line relay LR and at the same time connected to the register REG since the contacts $C^0$ and $C^1$ are reversed depending upon the energization of the cut off relay CR. The line relay LR as well as the cut off relay CR remains operating because the closed circuit including these are formed via ground at the resister REG.

The AR relay in FIG. 4 is energized when the closed circuit is formed from AR (the coil II) through $S^3(M)$, lead II', $TP_0$, $TS_0$, $LS_0$, $LP_0$, lead II, $l^0(M)$, $C^0(M)$, EXT, $C^1(M)$, $l^1(M)$, lead I, $LP_0$, $LS_0$, $TS_0$, $TP_0$, lead I', $S^4(M)$, AR (the coil I), and $E_4$, to ground. The energization of the AR relay causes the contact $a^0(M)$ to be closed, thereby forming the closed circuit consisting of ground, $a^0(M)$, the coil of the BR relay and the battery $E_3$, resulting in the operation of the BR relay. The energization of the relay BR forms the circuit for holding the relay SR comprising $rl^0(B)$, $b^0(M)$, $S^0(M)$, SR (the coil II), $E_3$ and ground. The common control, after completing the necessary control for the register REG of the outgoing terminal unit, functions to release the common control per se as well as the relay FR of the register REG.

The register REG serves to receive the dialed information supplied from the subscriber's end device EXT and then to transfer it to the common control CC. The common control CC, in response to the signal from the register REG, establishes the connection between the necessary outgoing terminal unit, for example, the outgoing trunk, and the line circuit LC. Although the outgoing trunk is not shown, it has a switch relay SR as the register REG has. The connecting operation between the outgoing trunk and the line circuit LC is performed in the same way as the one of the register REG. That is to say, after closing the cross points between the line circuit LC and the outgoing trunk, the common control CC energizes the switch relay SR of the outgoing trunk to complete the connection between the outgoing trunk and the line circuit. The register release relay RL (not shown) is energized to open the associated break contact $rl^0(B)$. As a result, the circuit for holding the relay SR is opened, and also disconnected is the connection between the register REG and the crossbar switch $TP_0$. On the other hand, in the register REG, the relays AR, BR and the relay RL (not shown) are released successively. The connection between the ground and the lead III of the line circuit LC is formed by the outgoing trunk instead of the register REG. The end of the call connection causes the loop circuit in the subscriber's end device EXT to be cut off, and supplies an on-hook signal to the outgoing trunk. This signal in the outgoing trunk serves to release the switch relay SR provided therein, resulting in the release of the outgoing trunk per se. Moreover, the release of the relay SR in the outgoing trunk compels the connection from the ground through the associated contact to the lead III of the line circuit LC to be disconnected with result that the relays LR and CR are released and released is also the connection between the subscriber's end device EXT and the crossbar switch $LP_0$.

As described in the above, in the telephone exchange system according to the present invention, the signal indicating the opening of the subscriber's loop circuit causes the channel to be opened either at the incoming terminal unit or the outgoing terminal unit so that the release operation of the crossbar switch of mechanical holder type becomes unnecessary, thereby accomplishing the improvement in simplification and in the cost reduction. Particularly, the present invention is effective in the application for the telephone exchange system of small type.

While there have been described what are at present considered to be preferred embodiments of the invention, it will be obvious to those skilled in the art that various changes and modifications may be made within the scope of the appended claims without departing from the scope and spirit of the invention.

What is claimed is:

1. In a telephone exchange system including a switch frame having a plurality of input terminals and a plurality of output terminals, between which terminals selectively interconnectable stage of mechanical latching type crossbar switches are coupled;

an incoming terminal unit having its input coupled to an external end device and its output coupled to one of said input terminals of said switch frame;

an outgoing terminal unit having its input coupled to one of said output terminals of said switch frame; and a common control for controlling the establishment of a channel through the crossbar switches from the input to output terminals thereof and for setting up a call connection circuit from the external end device, through the incoming terminal unit and the channel, to said outgoing terminal unit;

the improvement wherein said outgoing terminal unit comprises:

first disconnecting means, responsive to the opening of the call connection circuit at the external end device, for electrically disconnecting the input of said outgoing terminal unit with the output terminal of said switch frame; and said incoming terminal unit comprises second disconnecting means, responsive to the disconnecting of the call connection at the outgoing terminal unit by the first disconnecting means, for electrically disconnecting the output of said incoming terminal unit with the input terminal of said switch frame.

2. A telephone exchange system according to claim 1, wherein said incoming terminal unit is a subscriber's line circuit containing a line relay and a cut-off relay, the closure of the contacts of which effect the connection of said external end device to said switch frame, while the opening of the contacts thereof break said connection.

* * * * *